United States Patent
Kazmirski et al.

(10) Patent No.: US 6,290,035 B1
(45) Date of Patent: Sep. 18, 2001

(54) ACCELERATION SENSITIVE DAMPING FOR AUTOMOTIVE DAMPERS

(75) Inventors: Karl C. Kazmirski, Toledo, OH (US); Charles E. Tyrrell, Monroe, MI (US); David Steed, Perrysburg, OH (US); Rich Huger, Monroe; Dale Hoppert, Petersburg, both of MI (US); Wayne Johnson, Toledo; Timothy E. Bombrys, Bowling Green, both of OH (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/443,236

(22) Filed: Nov. 18, 1999

Related U.S. Application Data

(63) Continuation-in-part of application No. 09/044,715, filed on Mar. 19, 1998, now Pat. No. 5,992,585.

(51) Int. Cl.[7] .............................................. F16F 9/34
(52) U.S. Cl. ...................................... 188/322.14; 188/282.5
(58) Field of Search ........................... 188/266.2, 322.14, 188/322.15, 315, 281, 282.5, 282.6, 322.19, 288, 275, 181 A

(56) References Cited

U.S. PATENT DOCUMENTS

| | | |
|---|---|---|
| 2,616,711 | 11/1952 | Whisler, Jr. et al. . |
| 2,726,737 | 12/1955 | Chisholm, Jr. . |
| 3,090,611 | 5/1963 | Schultze . |
| 3,874,478 | 4/1975 | Mantell, Jr. . |
| 4,082,169 | 4/1978 | Bowles . |
| 4,589,528 | 5/1986 | Axthammer et al. . |
| 4,602,707 | 7/1986 | Zumwinkel et al. . |
| 4,989,699 | 2/1991 | Zaenglein et al. . |
| 5,129,488 | * 7/1992 | Furuya et al. ................. 188/282.6 |
| 5,150,775 | 9/1992 | Charles et al. . |
| 5,333,708 | 8/1994 | Jensen et al. . |
| 5,464,079 | 11/1995 | Lohberg et al. . |
| 5,638,927 | 6/1997 | Cheatham et al. . |

FOREIGN PATENT DOCUMENTS

| | | |
|---|---|---|
| 910494 | 3/1954 | (DE) . |
| 621630 | 8/1945 | (GB) . |
| 2066923 A | 12/1980 | (GB) . |
| 2090643 A | 1/1981 | (GB) . |
| 2090644 | 1/1981 | (GB) . |
| 58-065340 | * 4/1983 | (JP) . |
| 03-168430 | * 7/1991 | (JP) . |
| A-5-288233 | 11/1993 | (JP) . |
| 07-190125 | * 7/1995 | (JP) . |
| 11-287282 | * 10/1999 | (JP) . |
| SU 1404703 A1 | 6/1988 | (RU) . |

* cited by examiner

Primary Examiner—Robert J. Oberleitner
Assistant Examiner—Mariano Sy
(74) Attorney, Agent, or Firm—Harness, Dickey & Pierce, PLC

(57) ABSTRACT

A shock absorber has a base valve assembly which includes a compression valve assembly and an acceleration valve assembly. The compression valve assembly controls a fluid path through the base assembly to provide a firm damping characteristic for the shock absorber during low acceleration movement. The acceleration valve assembly controls a second fluid path through the base assembly to provide a soft damping characteristic for the shock when the shock absorber experiences acceleration beyond a specified amount.

18 Claims, 4 Drawing Sheets

ACCELERATION SENSITIVE DAMPING FOR AUTOMOTIVE DAMPERS

CROSS REFERENCE TO RELATED APPLICATIONS

This application is a continuation-in-part of U.S. application Ser. No. 09/044,715, filed Mar. 19, 1998 which is now U.S. Pat. No. 5,992,585.

FIELD OF THE INVENTION

The present invention relates generally to automotive dampers or shock absorbers which receive mechanical shock. More particularly, the present invention relates to automotive dampers or shock absorbers which are sensitive to accelerations imposed upon the damper or shock absorber to switch between a firm and a soft damping characteristic.

BACKGROUND OF THE INVENTION

Shock absorbers are used in conjunction with automotive suspension systems to absorb unwanted vibrations which occur during driving. To absorb unwanted vibrations, shock absorbers are generally connected between the sprung portion(body) and the unsprung portion (suspension) of the automobile. A piston is located within a pressure tube of the shock absorber and is connected to the sprung portion of the automobile through a piston rod. The piston divides the pressure tube into an upper working chamber and a lower working chamber. Because the piston is able, through valving, to limit the flow of damping fluid between the upper and lower working chambers when the shock absorber is compressed or extended, the shock absorber is able to produce a damping force which counteracts the vibration which would otherwise be transmitted from the unsprung portion to the sprung portion of the automobile. In a dual tube shock absorber, a fluid reservoir is defined between the pressure tube and the reservoir tube. A base valve is located between the lower working chamber and the reservoir to limit the flow of fluid between the lower working chamber and the reservoir to produce a damping force which also counteracts the vibration which would otherwise be transmitted from the unsprung portion to the sprung portion of the automobile. The greater the degree to which the flow of fluid within the shock absorber is restricted by the piston valving or the base valve, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred. Vehicle handling is related to the variation in the vehicle's attitude (i.e. roll, pitch and yaw). For optimum vehicle handling, relatively large damping forces or a firm ride are required to avoid excessively rapid variations in the vehicle's attitude during cornering, acceleration and deceleration. Road holding ability is generally a function of the amount of contact between the tires and the ground. To optimize road handling ability, large damping forces are required when driving on irregular surfaces to prevent loss of contact between the wheel and the ground for excessive periods of time.

Various methods for selectively changing the damping characteristics of a shock absorber in response to the operational characteristics of the vehicle have been developed. Continued development of shock absorbers have been directed towards simplified and low cost systems which effectively control the damping characteristics of the shock absorber in response to the varied operational characteristics of the vehicle.

SUMMARY OF THE INVENTION

The present invention provides the art with a dual or twin tube shock absorber which incorporates a compression valving system in the base valve of the shock absorber which is sensitive to accelerations imposed upon the shock absorber during movements of the unsprung mass. The compression valving system replaces the standard compression valving system in the base valve with a valving system sensitive to accelerations imposed upon the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
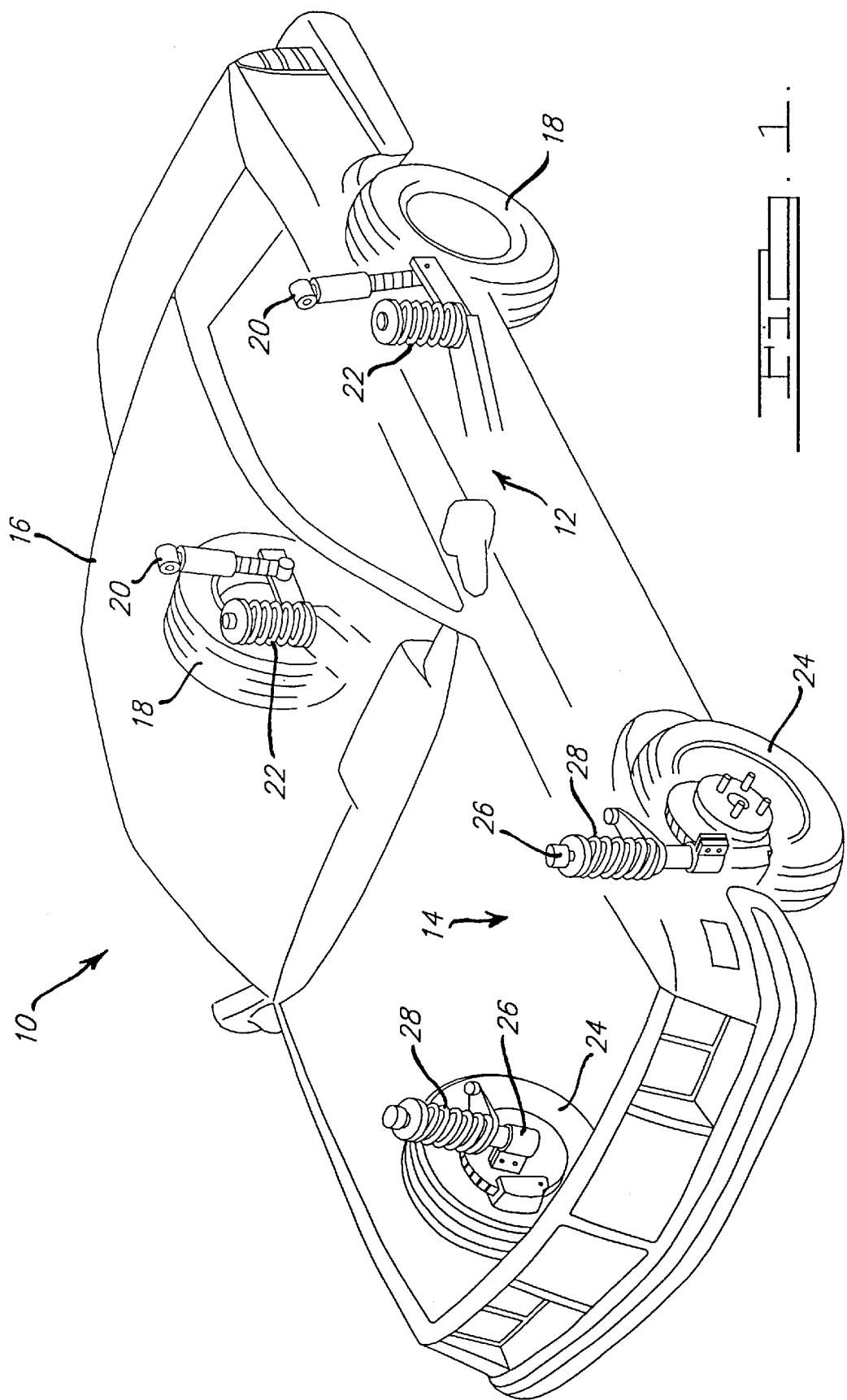
FIG. 1 is an illustration of an automobile using the automatically adjustable damping system in accordance with the present invention.

Referring now to the drawings in which like reference numerals designate like or corresponding parts throughout the several views, there is shown in FIG. 1 a vehicle incorporating a suspension system having the automatically adjustable shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
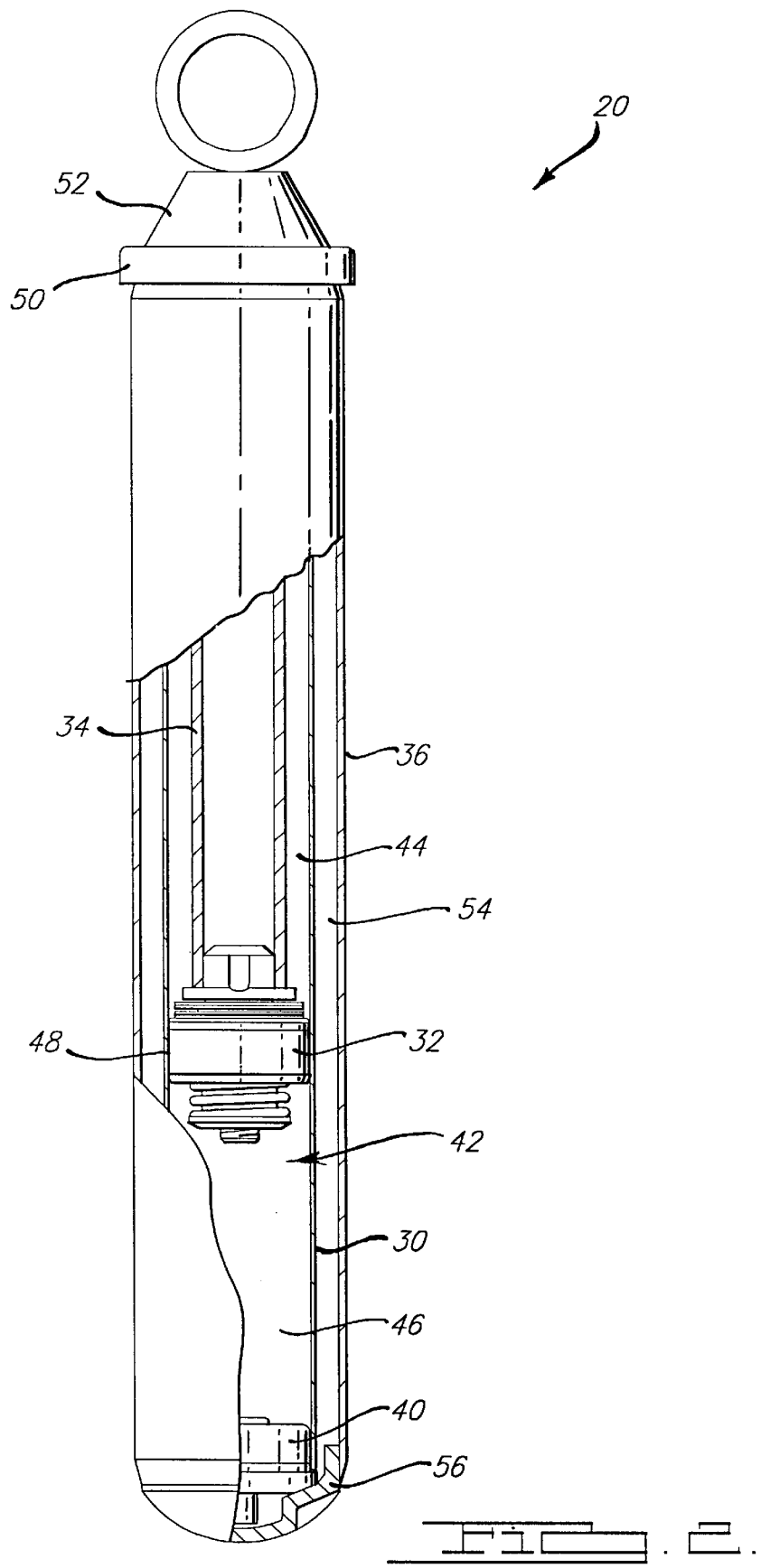
FIG. 2 is a side view, partially in cross section, of a shock absorber incorporating the automatically adjustable damping system in accordance with the present invention.

Referring now to FIG. 2, shock absorber 20 is shown in greater detail. While FIG. 2 shows only shock absorber 20, it is to be understood that shock absorber 26 also includes the piston and base valving described below for shock absorber 20. shock absorber 26 only differs from shock absorber 20 in the way in which it is adapted to be connected to the sprung and unsprung portions of vehicle 10. Shock absorber 20 comprises a pressure tube 30, a piston 32, a piston rod 34, a reservoir tube 36 and a base valve assembly 40.

Pressure tube 30 defines a working chamber 42. Piston 32 is slidably disposed within pressure tube 30, and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper end cap 50 which closes the upper end of both pressure tube 30 and reservoir tube 36. A sealing system 52 seals the interface between upper end cap 50, reservoir tube 36 and piston rod 34. The end of piston rod 34 opposite to piston 32 is adapted to be secured to the sprung portion of vehicle 10. In the preferred embodiment, piston rod 34 is secured to body 16 or the sprung portion of vehicle 10. Valving within piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by an end cap 56 which is adapted to be connected to the unsprung portions of vehicle 10. In the preferred embodiment, end cap 56 and reservoir tube 36 are attached to the unsprung portion of vehicle 10. The upper end of reservoir tube 36 is attached to upper end cap 50. Base valve assembly 40 is disposed between lower working chamber 46 and reservoir chamber 54 to control the flow of fluid between the two chambers. When shock absorber 20 extends in length, an additional volume of fluid is needed in lower working chamber 46 due to the "rod volume" concept. Thus, fluid will flow from reservoir chamber 54 to lower working chamber 46 through base valve assembly 40. When shock absorber 20 compresses in length, an excess of fluid must be removed from lower working chamber 46 due to the "rod volume" concept. Thus fluid will flow from lower working chamber 46 to reservoir chamber 54 through base valve assembly 40.

The present invention is directed to a unique base valve assembly 40 which automatically changes the restriction to fluid flow through base valve assembly 40 based upon the acceleration forces exerted on shock absorber 20 during a compression stroke of shock absorber 20. Base valve assembly 40 automatically switches between a restricted flow condition or firm ride as shown in FIG. 3 and a less restricted flow condition or soft ride as shown in FIG. 4.

Figure 3:
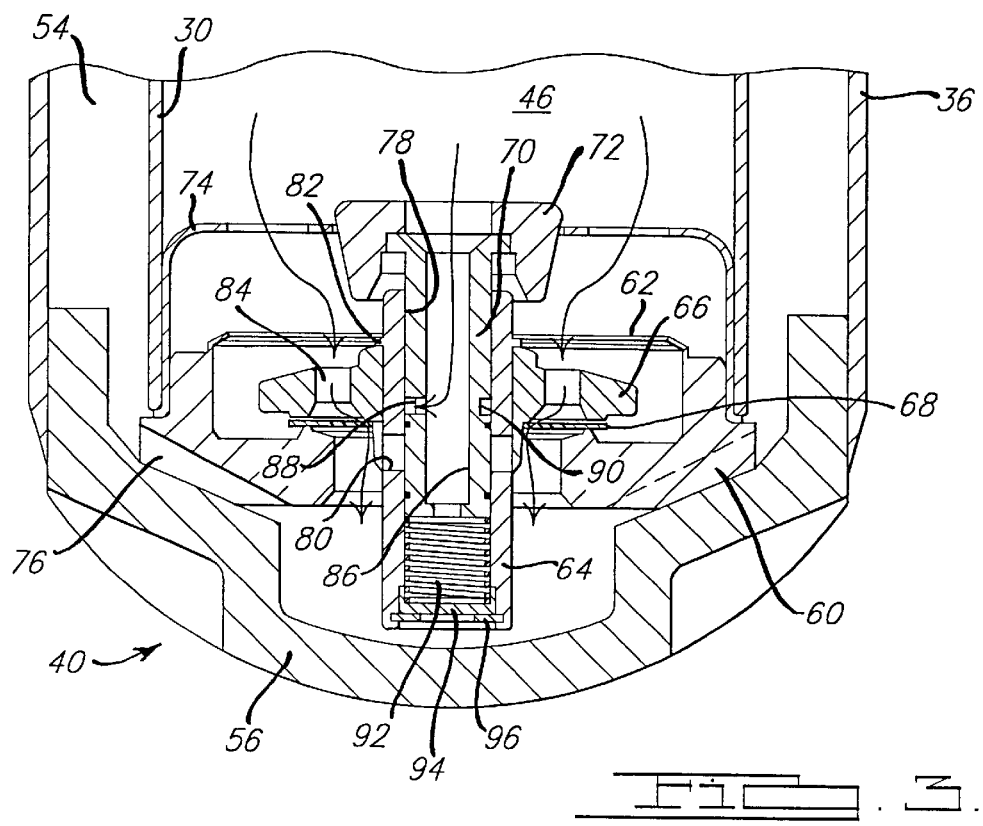
FIG. 3 is an enlarged side elevational view, partially in cross section, of the base valve portion of the shock absorber shown in FIG. 2 with the damping system providing a higher restriction to fluid flow and thus a firm ride.
Figure 4:
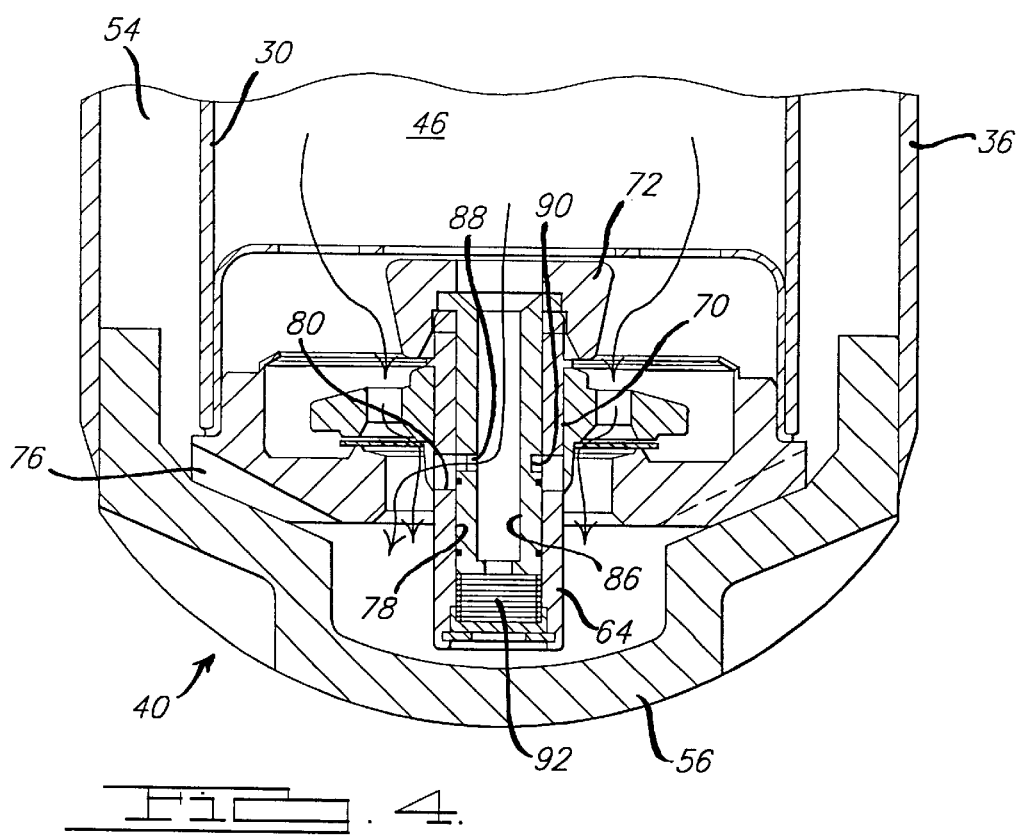
FIG. 4 is a view similar to FIG. 3 but with the damping system providing a lower restriction to fluid flow and thus a smooth ride.

Referring now to FIG. 3, base valve assembly 40 comprises an end cap 60, a finger spring 62, a sleeve 64, a valve body 66, a valve disk 68, a valve spool 70, a mass 72 and a valve retainer 74. End cap 60 is secured to the end of pressure tube 30 by being press fit into pressure tube 30 or by other means known well in the art. Valve retainer 74 is disposed between end cap 60 and pressure tube 30 such that the assembly of end cap 60 to pressure tube 30 also locates and secures valve retainer 74. End cap 60 defines a plurality of fluid passageways 76 which extend between lower working chamber 46 and reservoir chamber 54. Finger spring 62 is secure to end cap 60 and operates to bias valve body 66 against valve disk 68 and valve disk 68 against end cap 60. Sleeve 64 is secured to valve body 66 using an interference fit and extends through valve body 66, valve disk 68 and end cap 60 and defines an internal bore 78 and a radial bore 80. Sleeve 64 includes a radially extending flange 82 which abuts valve body 66. Valve body 66 is disposed between flange 82 of sleeve 64 and end cap 60. Valve body 66 defines a plurality of bores 84 through which hydraulic fluid flows during a compression stroke of shock absorber 20. Valve disk 68 is disposed between valve body 66 and end cap 60 and functions to restrict the flow of fluid between lower working chamber 46 and reservoir chamber 54 during a compression stroke of shock absorber 20. The stiffness of valve disk 68 is designed to provide a high resistance to fluid flow and thus a firm ride.

Spool 70 is slidingly disposed within internal bore 78 of sleeve 64. Spool 70 defines an internal bore 86, a radial bore 88 and an annular groove 90. Mass 72 is attached to the top of spool 70. Spool 70 and mass 72 are biased against valve retainer 74 by a valve spring 92 which is disposed within bore 78 of sleeve 64. Valve spring 92 reacts against an end plug 94 which is secured by a retainer 96 to bias spool 70 and mass 72 upward against valve retainer 74 to provide the desired response for base valve assembly 40.

During an extension stroke of shock absorber 20, fluid flows from reservoir chamber 54 through base valve assembly 40 into lower working chamber 46. Fluid within chamber 54 flows through fluid passageways 76 and causes fluid pressure to be exerted on the lower surface of valve disk 68. This fluid pressure builds to the point that valve disk 68 urges against valve body 66 which urges against finger spring 62 to cause movement of valve body 66 and valve disk 68 and the unseating of valve disk 68 from end cap 60 permitting fluid to flow to lower working chamber 46. The movement of valve body 66 also moves sleeve 64 which slides along spool 70 due to spool 70 and mass 72 being retained by valve retainer 74.

During normal operation of base valve assembly 40 during a compression stroke of shock absorber 20, a firm ride or restrictive fluid flow through base valve assembly 40 is provided. Spool 70 and mass 72 are located in a static position which allows for the firm damping. Fluid flows from lower working chamber 46 to reservoir chamber 54.

Fluid flow occurs through valve retainer 74, through finger spring 62, through bores 84 of valve body 66 until sufficient pressure has been built up against valve disk 68 to unseat valve disk 68 from valve body 66. This allows fluid flow as shown by the arrows in FIG. 3 and provides a firm ride which is controlled by the stiffness of valve disk 68.

Referring now to FIG. 4, base valve assembly 40 is shown providing a less restrictive flow or a soft ride characteristic. When sufficient acceleration from road input is achieved which is greater than the calibrated acceleration level, mass 72 and the mass of spool 70 overcome the spring force of valve spring 92. The overcoming of the spring force of valve spring 92 causes spool 70 to slide within bore 78 of sleeve 64 to align annular groove 90 with radial bore 80 of sleeve 64. Fluid flows from lower working chamber 46 through bore 86 of spool 70, through radial bore 88 and into annular groove 90. Fluid flows from annular groove 90 through radial bore 80 of sleeve 64 through the fluid passageways 76 of end cap 60 into reservoir chamber 54. Fluid pressure will also build up against valve disk 68 to provide a second flow path identical to that described above for FIG. 3 for the firm damping flow path. These two flow paths as shown by the arrows in FIG. 4 provide a soft ride which is controlled by the stiffness of valve disk 68, the size of bores 86, 88, 80 and groove 90, and the size of mass 72.

Base valve assembly 40 thus provides firm damping for minimum road inputs or acceleration while switching to soft damping for large road inputs or wheel accelerations. This system significantly reduces the ride harshness while providing proportional compression damping relative to wheel acceleration.

Figure 5:
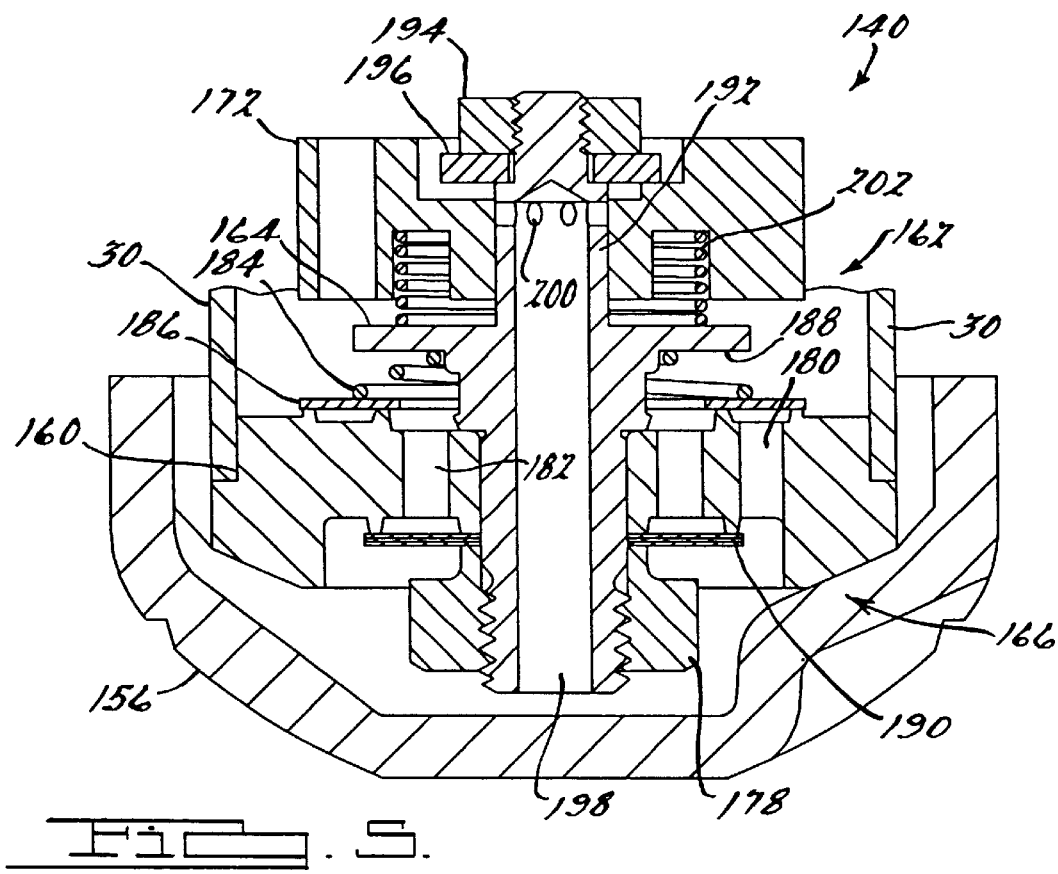
FIG. 5 is an enlarged side view, partially in cross section, of a base valve assembly in accordance with another embodiment of the present invention with the damping system providing a higher restriction to fluid flow and thus a firm ride.
Figure 6:
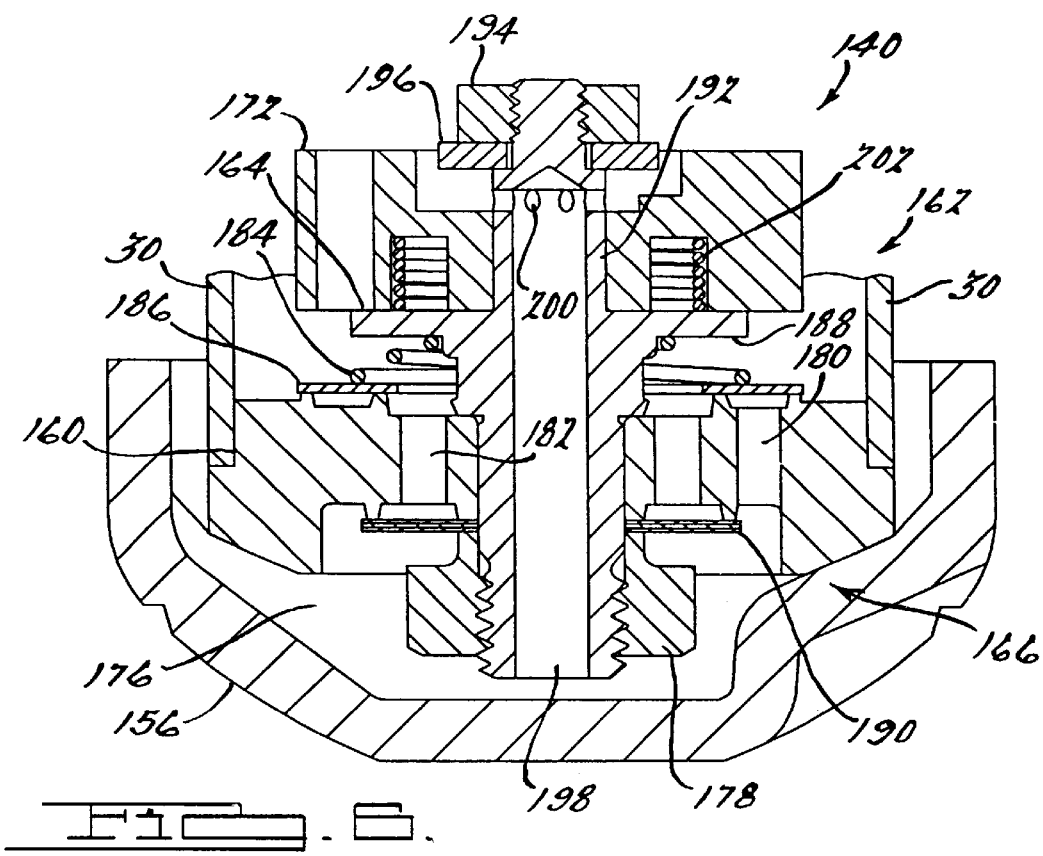
FIG. 6 is a view similar to FIG. 5 but with the damping system positioned after the actuation of the acceleration sensitive damping system thus providing a lower restriction to fluid flow thereby providing soft damping.

Referring now to FIGS. 5 and 6, a base valve assembly 140 in accordance with another embodiment of the invention is illustrated. Base valve assembly 140 comprises an end cap 156, an end cap 160, a rebound valve assembly 162, a bolt 164, a compression valve assembly 166, and a mass 172. End cap 156 closes the end of reservoir tube 36 similar to end cap 56 and it is adapted to be connected to the unsprung portion of vehicle 10. End cap 156 defines a plurality of fluid passages 176 which extend between lower working chamber 46 and reservoir chamber 54.

End cap 160 is secured to the end of pressure tube 30 by being press fit into pressure tube 30 or by other means known well in the art. Bolt 164 extends through a bore in end cap 160 and is retained within the bore by a nut 178. End cap 160 includes a plurality of rebound fluid passages 180 and a plurality of compression fluid passages 182.

Rebound valve assembly 162 includes a coil spring 184 and a valve disk 186. Spring 184 and disk 186 are disposed between a shoulder 188 on bolt 164 and end cap 160. Valve disk 186 is biased against end cap 160 to close the plurality of rebound fluid passages 180 while leaving open the plurality of compression fluid passages 182. During a rebound stroke, the fluid pressure within reservoir chamber 54 exceeds the fluid pressure within lower working chamber 46. This fluid pressure acts against valve disk 186 via passages 180 until the load exerted against valve disk 186 by the fluid pressure exceeds the load being exerted by coil spring 184. Valve disk 186 will then unseat from end cap 160 to allow fluid flow from reservoir chamber 54 into lower working chamber 46.

Compression valve assembly 166 includes nut 178 and a plurality of valve disks 190. Valve disks 190 are clamped against end cap 160 by nut 178 to close the plurality of compression fluid passages 182 while leaving open the plurality of rebound passages 180. During a compression stroke, the fluid pressure within lower working chamber 46 exceeds the fluid pressure within reservoir chamber 54. This fluid pressure acts against valve disks 190 via passages 182 until the load exerted against valve disks 190 by the fluid pressure exceeds the bending load for the plurality valve disks 190. Valve disks 190 will then elastically deflect to allow fluid flow from lower working chamber 46 to reservoir chamber 54.

Rebound valve assembly 162 and compression valve assembly 166 are thus similar to the current day valving system which is one of the advantages of the present invention. The standard clamped disk valving system which is incorporated into base valve assembly 140 is favored by ride control experts over other valving techniques. The present invention includes the standard clamped disk valving system in order to keep all of the advantages of these designs while adding to these robust designs the acceleration sensitive damping system.

The acceleration sensitive damping system includes mass 172 which is slidingly received on a cylindrical extension 192 of bolt 164. A nut 194 and a washer 196 limit the movement of mass 172 on extension 192 while simultaneously maintaining the sliding engagement between mass 172 and extension 192. An axial passage 198 extends through bolt 164 and mates with a plurality of radial passages 200 extending through extension 192 of bolt 164. Mass 172 is biased upwards or towards nut 194 and washer 196 to close the plurality of passages 200 by a coil spring 202. Coil spring 202 is located between shoulder 188 and mass 172.

During an extension or rebound stroke of the shock absorber, fluid flows from reservoir chamber 54 through base valve assembly 140 into lower working chamber 46. Fluid pressure within chamber 54 extends through fluid passages 176 and causes fluid pressure to be exerted against the lower surface of valve disk 186 via passages 180. This fluid pressure builds to the point that the load being exerted against valve disk 186 exceeds the biasing of coil spring 184. Valve disk 186 will unseat from end cap 160 permitting fluid flow from reservoir chamber 54 to lower working chamber 46.

FIG. 5 illustrates normal operation of base valve assembly 140 during a compression stroke of shock absorber 20. During normal operation, a relatively firm ride or restricted fluid flow through base valve assembly 140 is provided. Mass 172 is located in its upper position or biased away from shoulder 188 by coil spring 202 to close passages 200. During a compression stroke, fluid flows from lower working chamber 46 to reservoir chamber 54. Fluid pressure builds in lower working chamber 46 until sufficient pressure is exerted against valve disks 190 via passages 182 to cause the elastic bending or deformation of valve disks 190. This allows fluid flow from lower working chamber 46 to reservoir chamber 54 through passages 182.

FIG. 6 illustrates the activation of the acceleration sensitive damping system of the present invention which provides a soft ride or less restrictive flow of fluid between lower working chamber 46 and reservoir chamber 54. When sufficient acceleration from road input is achieved which is greater than the calibrated acceleration level, mass 172 will react due to inertia and compression of spring 202 will occur due the relative movement between mass 172 and extension 192 of bolt 164. This relative movement will open fluid passages 200 to allow relatively unrestricted fluid flow from lower working chamber 46 to reservoir chamber 54 through radial passages 200 and axial passage 198. The flow rate of fluid through base valve assembly 140 during a compression stroke is first controlled by the stiffness of the plurality of disks 190. When the acceleration sensitive damping system is activated, the damping rate is controlled by the size of passages 200 and 198, the size of mass 172 and the stiffness of coil spring 202.

Similar to base valve assembly 40, base valve assembly 140 provides relatively firm damping during normal road inputs while switching to soft damping during acceleration or large road inputs. Base valve assembly 140 combines acceleration sensitive damping with the function of a standard clamped disk base valve. This design allows high flow rates while minimizing the dead length in the damper unit itself. The design is easy to manufacture, easy to assembly and less sensitive to tolerance stackup. The mass is rigidly bolted to the base valve assembly making it less prone to damage both before and after assembly into the shock absorber.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
    a pressure tube forming a working chamber;
    a reservoir tube disposed around said pressure tube, said reservoir tube forming a reservoir chamber between said pressure tube and said reservoir tube;
    a base valve assembly disposed between said working chamber and said reservoir chamber for regulating flow of damping fluid between said working chamber and said reservoir chamber, said base valve assembly comprising:
        a pressure responsive valve for allowing said damping fluid to flow from said working chamber to said reservoir chamber in response to fluid pressure within said working chamber; and
        an acceleration responsive valve being movable from a first position for restricting flow of said damping fluid between said working chamber and said reservoir chamber to a second position for allowing said damping fluid to flow from said working chamber to said reservoir chamber in response to acceleration of said damper.

2. The damper according to claim 1 further comprising a piston disposed within said working chamber, said piston dividing said working chamber into an upper portion and a lower portion, said base valve assembly being disposed between said lower portion of said working chamber and said reservoir chamber.

3. The damper according to claim 1, wherein said base valve assembly further comprises a rebound valve for prohibiting said damping fluid to flow from said working chamber to said reservoir chamber while allowing said damping fluid to flow from said reservoir chamber to said working chamber.

4. The damper according to claim 1, wherein said base assembly further comprises an end cap and a bolt for securing said pressure responsive valve to said end cap.

5. The damper according to claim 4, wherein said acceleration responsive valve includes a mass slidingly received on said bolt.

6. The damper according to claim 5, wherein said bolt defines a fluid path for said acceleration sensitive valve.

7. The damper according to claim 1, wherein said pressure responsive valve includes at least one valve disk.

8. A damper comprising:
    a pressure tube forming a working chamber;
    a reservoir tube disposed around said pressure tube, said reservoir tube forming a reservoir chamber between said pressure tube and said reservoir tube;
    a base valve assembly disposed between said working chamber and said reservoir chamber for regulating flow of said damping fluid between said working chamber and said reservoir chamber, said base valve assembly comprising:
        a first check valve for allowing fluid flow from said working chamber to said reservoir chamber while prohibiting fluid flow from said reservoir chamber to said working chamber;
        a second check valve for allowing fluid flow from said reservoir chamber to said working chamber while prohibiting fluid flow from said working chamber to said reservoir chamber; and
        an acceleration sensitive valve being movable from a first position for restricting flow of said damping fluid between said working chamber and said reservoir chamber to a second position for opening a fluid path between said working chamber and said reservoir chamber in response to acceleration of said damper.

9. The damper according to claim 8, further comprising a piston disposed within said working chamber, said piston dividing said working chamber into an upper portion and a lower portion, said base valve assembly being disposed between said lower portion of said working chamber and said reservoir chamber.

10. The damper according to claim 8, wherein said base valve assembly includes an end cap and said first check valve includes at least one valve disk secured to said end cap.

11. The damper according to claim 8, wherein said base assembly includes an end cap and said acceleration sensitive valve comprises a bolt extending through said end cap and a mass slidingly received on said bolt, said bolt defining said fluid path, said fluid path being open and closed by sliding movement of said mass.

12. The damper according to claim 11, wherein said first check valve includes at least one valve disk secured to said end cap.

13. The damper according to claim 12, wherein said second check valve includes at least one valve disk secured to said end cap.

14. A damper comprising:
    a pressure tube forming a working chamber;
    a reservoir tube disposed around said pressure tube, said reservoir tube forming a reservoir chamber between said pressure tube and said reservoir tube;
    a base valve assembly disposed between said working chamber and said reservoir chamber for regulating flow of said damping fluid between said working chamber and said reservoir chamber, said base valve assembly comprising:
        an end cap disposed between said pressure tube and said reservoir tube;
        said end cap defining an acceleration fluid passage, a rebound fluid passage and a compression fluid passage;
        a rebound valve for controlling fluid flow through said rebound fluid passage;
        a compression valve for controlling fluid flow through said compression fluid passage; and an acceleration valve being movable from a first position for restricting fluid flow through said acceleration fluid passage to an open position for allowing fluid flow through said acceleration fluid passage.

15. The damper according to claim 14, wherein said acceleration valve comprises a bolt extending through said end cap and a mass slidingly received on said bolt, sliding movement of said mass being operable to open and close said acceleration fluid passage.

16. The damper according to claim 15, wherein said compression valve includes a valve disk secured to said end cap.

17. The damper according to claim 16, wherein said rebound valve includes a valve disk secured to said end cap.

18. The damper according to claim 14, wherein said compression valve includes a valve disk secured to said end cap.

* * * * *